(12) United States Patent
Hardee et al.

(10) Patent No.: US 10,397,171 B2
(45) Date of Patent: Aug. 27, 2019

(54) MANAGING CONTENT DISCLOSURE ON SOCIAL NETWORKING SITES

(71) Applicant: International Business Machines Corporation, Armonk, NY (US)

(72) Inventors: Christopher J. Hardee, Raleigh, NC (US); Steven R. Joroff, River Vale, NJ (US); Pamela A. Nesbitt, Ridgefield, NC (US); Scott E. Schneider, Rolesville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

(21) Appl. No.: 15/475,473

(22) Filed: Mar. 31, 2017

(65) Prior Publication Data

US 2018/0287989 A1    Oct. 4, 2018

(51) Int. Cl.
| | |
|---|---|
| *H04L 29/06* | (2006.01) |
| *H04L 12/58* | (2006.01) |
| *H04L 29/08* | (2006.01) |
| *G06F 16/335* | (2019.01) |

(52) U.S. Cl.
CPC ............ *H04L 51/32* (2013.01); *G06F 16/335* (2019.01); *H04L 67/10* (2013.01); *H04L 67/22* (2013.01); *H04L 67/306* (2013.01)

(58) Field of Classification Search
CPC ...................................................... H04L 51/22
See application file for complete search history.

(56) References Cited

U.S. PATENT DOCUMENTS

| | | | |
|---|---|---|---|
| 9,239,876 B2* | 1/2016 | Kraley | G06F 17/30705 |
| 2002/0198909 A1 | 12/2002 | Huynh et al. | |
| 2008/0195657 A1 | 8/2008 | Naaman et al. | |
| 2013/0179271 A1* | 7/2013 | Adams | G06Q 50/01 |
| | | | 705/14.66 |

OTHER PUBLICATIONS

Ido Guy, et al., "Social Media Recommendation based on People and Tags", SIGIR, ACM, Jul. 29-23, 2010, p. 1-8.
Joep J.M. Kierkels, et al., "Queries and Tags in Affect-Based Multimedia Retrieval", IEEE, ICME, 2009, p. 1-4.
(Continued)

*Primary Examiner* — Adnan M Mirza
(74) *Attorney, Agent, or Firm* — Cantor Colburn LLP; Samuel Waldbaum (57) ABSTRACT

Embodiments include methods, systems and computer program products for managing content disclosure on social networking sites. In some embodiments, labels associated with a social network connection of a user can be associated with the social network connection based on the reactions of the social network connection to different social network posts. Content from a user device associated with the user can be received. The content can be processed to identify content types to associate with the content. A recommendation can be generated to share or not share the content with the social network connection based on the reactions to content posted by the user. An indication from the user to share the content with the social network connection can be received. The content can be shared with the social network connection based on the indication.

20 Claims, 6 Drawing Sheets

(56) References Cited

OTHER PUBLICATIONS

Kristina Lerman, et al.,"Social Browsing on Flickr", arXiv:cs, Dec. 7, 2006, p. 1-8.
Maja Pantic, et al,"Implicit Human-Centered Tagging" Social Sciences, IEEE Signal Processing Magazine, Nov. 2009, p. 1-8.
Pavan K. Vatturi, et al.,"Tag-Based Filtering for Personalized Bookmark Recommendations", ACM, Oct. 26-30, 2008, p. 1-2.

* cited by examiner

MANAGING CONTENT DISCLOSURE ON SOCIAL NETWORKING SITES

BACKGROUND

The present invention relates in general to object identification, and more specifically, to methods, systems and computer program products for managing content disclosure on social networking sites.

Social networking sites enable users to quickly share different types of content with many people. Examples of content may include, but are not limited, to text postings, pictures, videos, websites, location information, and the like. Social networking sites are often web-based and can be accessed through web-based applications on different types of devices. User-generated content, such as digital photos, videos, text posts, tagging of other individuals on the social networking site, websites, location information, identification of moods (e.g., using emoticons), location information, and the like, are often shared to a user's network of social connections on the social networking site. Users often have user-created profiles that display the user-generated content as well as information provided by the user, such as name, birthday, likes, dislikes, membership to groups, and the like. Social network connections on social networking sites can be the association or connection of user profiles on the social networking site.

SUMMARY

In accordance with one or more embodiments of the invention, a computer-implemented method for managing content disclosure on social networking sites is provided. In some embodiments of the invention, one or more labels can be associated with a social network connection of a user based on the reactions of the social network connection to different types of content within social network posts generated by the user. The social network connection can be classified into one or more groups based on the associated one or more labels for the social network connection. Content generated by the user on a user device can be monitored and processed to identify content types within the generated content that are associated with the content. Newly generated content can be processed based on the labels associated with the social network connection and content types associated with the newly generated content to determine whether the social network connection is allowed to view the newly generated content. The determination can result in the generation of a recommendation of whether or not to share the content having an associated content type with the labeled social network connection or a group comprising the social network connection. The recommendation can be based on determining that the labels associated with the social network connection are the same as corresponding content types associated with the content. An indication can be received from the user to share the content with the social network connection. The content can be shared with the social network connection based on the indication.

In one or more embodiments of the invention, a computer program product for managing content in social networking sites is provided. The computer program product includes a computer readable storage medium having program instructions embodied therewith, the program instructions readable by a processing circuit to perform a method that includes generating one or more labels that can be associated with a social network connection of a user based on the reactions of the social network connection to different types of content within social network content generated by the user. The social network connection can be classified into one or more groups based on the associated one or more labels for the social network connection. Content generated by the user on a user device can be monitored and processed to identify content types within the generated content that are associated with the content. Newly generated content can be processed based on the labels associated with the social network connection and content types associated with the newly generated content to determine whether the social network connection is allowed to view the newly generated content. The determination can result in the generation of a recommendation of whether or not to share the content having an associated content type with the labeled social network connection or a group comprising the social network connection. The recommendation can be based on determining that the labels associated with the social network connection are the same as corresponding content types associated with the content. An indication can be received from the user to share the content with the social network connection. The content can be shared with the social network connection based on the indication.

In one or more embodiments of the invention, a system can include a processor in communication with one or more types of memory. The processor can be configured to generate one or more labels that can be associated with a social network connection of a user based on the reactions of the social network connection to different types of content within social network content generated by the user. The social network connection can be classified into one or more groups based on the associated one or more labels for the social network connection. Content generated by the user on a user device can be monitored and processed to identify content types within the generated content that are associated with the content. Newly generated content can be processed based on the labels associated with the social network connection and content types associated with the newly generated content to determine whether the social network connection is allowed to view the newly generated content. The determination can result in the generation of a recommendation of whether or not to share the content having an associated content type with the labeled social network connection or a group comprising the social network connection. The recommendation can be based on determining that the labels associated with the social network connection are the same as corresponding content types associated with the content. An indication can be received from the user to share the content with the social network connection. The content can be shared with the social network connection based on the indication.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the invention, described herein are methods, systems and computer program products for managing content disclosure on social networking sites. Social networking sites often do not have control for disclosing content on a granular level. For example, if a picture is shared on a social networking site, the picture may be visible or not visible to individuals based on a level of social connection or explicit grouping on the social networking site. Generally, everyone on the same level of social connection or in the same group can see the same content. However, an individual may prefer to share content with certain connections (individual or group) while preventing other connections from viewing certain content. The systems and methods described herein are directed to controlling disclosure of content on social networking sites on a more granular level.

In some embodiments of the invention, the systems and methods described herein may determine how to categorize social network connections. For instance, the system can identify how social network connections react over time to content, i.e., specific images, words and phrases, and can make suggestions regarding how to tag the social network connection or to modify the categorization of the social network connection. In some embodiments of the invention, the system can monitor a set of actions of the social network connection to identify a mood to associate with the social network connection. For example, the system can determine that a social network connection has a negative mood based on a strongly negative reaction to identified content, which is labeled with a content type. Upon such a determination, the system can generate a label that can be associated with the social network connection based on the reaction to the content having a certain content type.

In some embodiments of the invention, the systems and methods described herein can support explicit sharing by enabling users of a social networking site to explicitly label a social network connection thereby indicating that the social network connection should or should not receive content having a content type associated with the associated label. Accordingly, social network connections can only view user-generated content explicitly designated by the user. Social network connections can be explicitly labeled to allow the connection to or prevent the connection from seeing specific types of content. Untagged content may be shared with the appropriate social network connections or groupings on the social networking site.

In some embodiments of the invention, the systems and methods can also support implicit sharing, where a system can automatically classify content by content type and share the classified content depending on a reaction to similarly classified content by a social network connection. The content being shared can depend on a generated confidence level, which takes into account the content to be shared with social network connection. Content can be processed to determine a content type to be associated with the content. When user generated content is added to the system, the system can categorize the added content based on the content type and a set of categories defined by the user or the system. Based on the content and the associated content type, the system can generate a confidence level for the associated content and content type. The confidence level can indicate the likelihood that the content was classified accurately. In some embodiments of the invention, if the confidence level associated with an identified content is low, it may be shared among a broader group of social network connections. In some embodiments of the invention, some social network connections may only be able to view content designated with a high confidence level.

In some embodiments of the invention, the system can generate a recommendation to the user. The recommendation can identify the content to be shared and a suggested list or group of social network connections with whom to share the content. Based on the response received from the user, the content can be shared with an identified social network connection.

Figure 1:
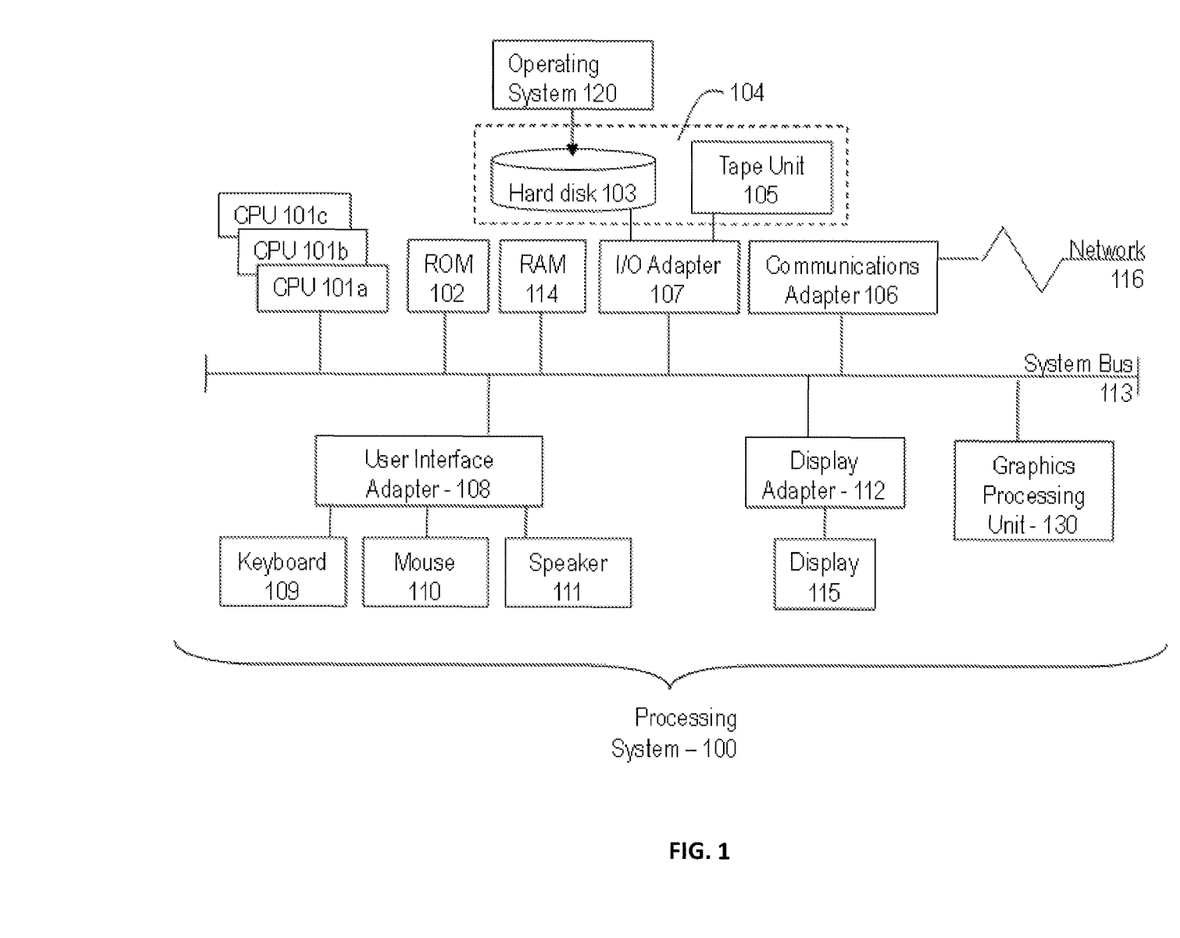
FIG. 1 is a block diagram illustrating one example of a processing system for practice of the teachings herein.

Referring to FIG. 1, there is shown a processing system 100 for implementing the teachings of the present disclosure according to one or more embodiments of the invention described herein. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments of the invention, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
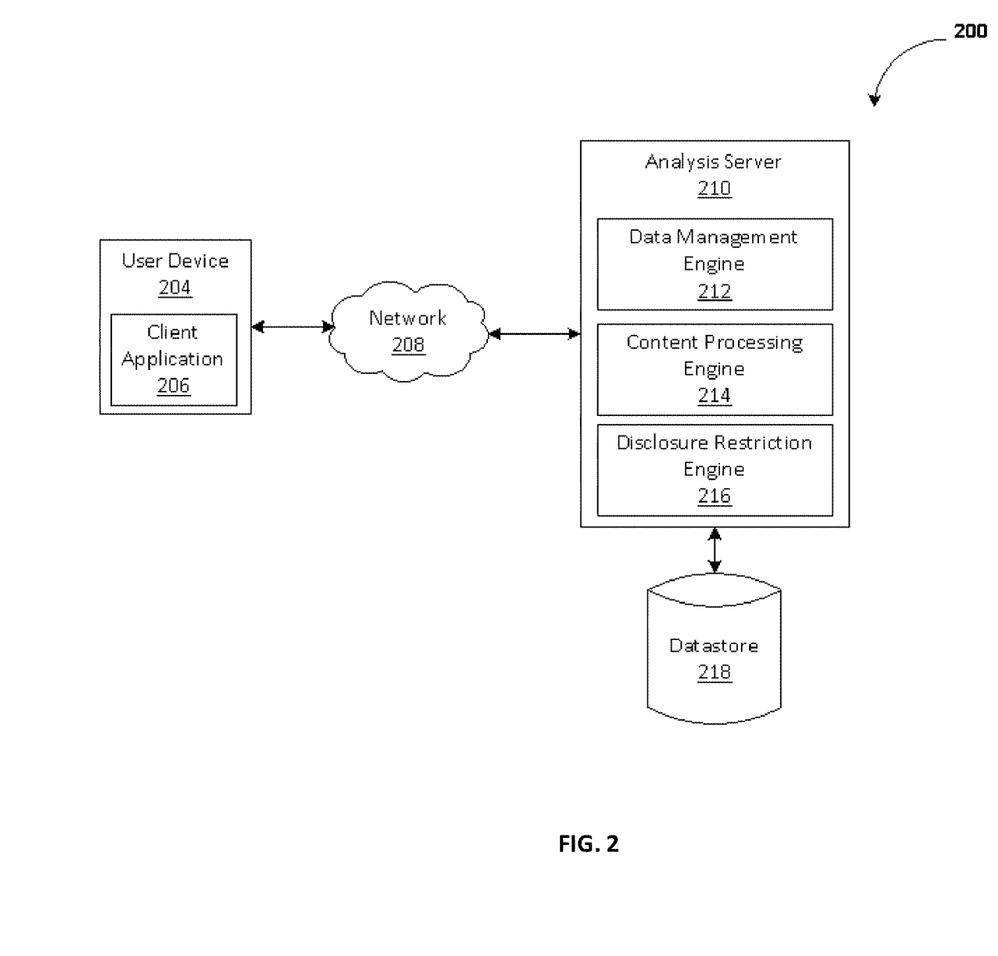
FIG. 2 is a block diagram illustrating a computing system in accordance with an exemplary embodiment.

Referring now to FIG. 2, there is illustrated a computing system 200 in accordance with one or more embodiments of the invention. As illustrated, the computing system 200 can include, but is not limited to, a user device 204, an analysis server 210, and/or a datastore 218 connected over one or more networks 208. In some embodiments of the invention, the user device 204 can include a client application 206. In some embodiments of the invention, the analysis server 210 can include a data management engine 212, a content processing engine 214, and/or a disclosure restriction engine 216.

In some embodiments of the invention, the user device 204 can be any type of computing device, such as a computer, laptop, tablet, smartphone, wearable computing device, server, etc. The user device 204 can include one or more applications, such as a web browser or dedicated client application 206 that can communicate with the analysis server 210 over one or more networks 208.

The client application 206 can include computer-readable instructions that in response to execution by the processor(s) 101, cause operations to be performed including accessing and using social networking sites, such as identifying social network connections, generating and maintaining a social networking site profile, uploading content, such as user-generated content, and the like.

The network(s) 208 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 208 can have any suitable communication range associated therewith and can include, for example, global networks (e.g., the Internet), metropolitan area networks (MANs), wide area networks (WANs), local area networks (LANs), or personal area networks (PANs). In addition, the network(s) 208 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

In some embodiments of the invention, the analysis server 210 can be any type of computing device with network access, such as a computer, laptop, server, tablet, smartphone, wearable computing devices, or the like. The analysis server 210 can be part of a cloud-computing environment that provides a specific functionality to the user device 204, such as a software-as-a-service functionality.

The data management engine 212 may include computer-readable instructions that, in response to execution by the processor(s) 101, cause operations to be performed including receiving data from user devices 204 and client applications 206 of user devices. The data management engine 212 can facilitate the transmission of and tracking of data to the content processing engine 214 and/or the disclosure restriction engine 216. The data management engine 212 can also facilitate retrieval and transmission of data to the datastore 218. The datastore 218 can store data for different aspects of managing content disclosure in social networking sites, such as metadata associated with social network connections and processed content.

The content processing engine 214 may include computer-readable instructions that, in response to execution by the processor(s) 101, cause operations to be performed including receiving content from the data management engine 212, which was received from a client application 206 of a user device 204. Examples of content can include, but are not limited to, text posts, pictures, videos, maps, emoticons, reactions to social media postings, and the like. The content processing engine 214 can process the content utilizing natural language processing or image analysis techniques to identify a content type to associate with the content. The content type can be metadata. The content type can be indicative of a content subject or one or more categories that can be associated with the content, and the like.

In some embodiments of the invention, the content processing engine 214 can generate a confidence level to associate with the content. The confidence level is a numeric value indicative of a likelihood that the content is accurately categorized.

The disclosure restriction engine 216 may include computer-readable instructions that, in response to execution by the processor(s) 101, cause operations to be performed, including generating labels to associate with social network connections of a user of a social networking site. The labels associated with social network connections can be generated based a profile associated with the social network connection, the activity of the social network connection (e.g., posting content to a social networking site, reacting to posts on the social networking site, etc.), and other factors. The social network connection can be associated with a group based on user or system criteria for the group. The disclosure restriction engine 216 can obtain data from the content processing engine 214 (e.g., via the data management engine 212) and/or the datastore 218 to determine whether to disclose content received from a user of the user device 204 to a social network connection. In some embodiments of the invention, the disclosure restriction engine 216 can generate a recommendation regarding the disclosure of content based on content types within the content. In some embodiments of the invention, the recommendation can identify the content to be disclosed and one or more suggested social network connections with whom to share or not share the content. In some embodiments of the invention, the social network connections can be identified based on their associated labels and/or groups. The disclosure restriction engine 216 can receive a response from the user device 204 regarding the recommendation. Based on the indication received from the user device 204, the disclosure restriction engine 216 may facilitate disclosure of the content to the identified approved social network connection.

The disclosure restriction engine 216 may also include computer-readable instructions that, in response to execution by the processor(s) 101, cause operations to be performed, including receiving labels from a user to associate with social network connections of the user for a social networking site. The disclosure restriction engine 216 can obtain data from the content processing engine 214 (e.g., via the data management engine 212) and/or the datastore 218 that has an associated content type in order to determine whether to disclose content received from a user of the user device 204 to a social network connection based on any associated labels for the social network connection and the content type associated with the content.

Figure 3A:
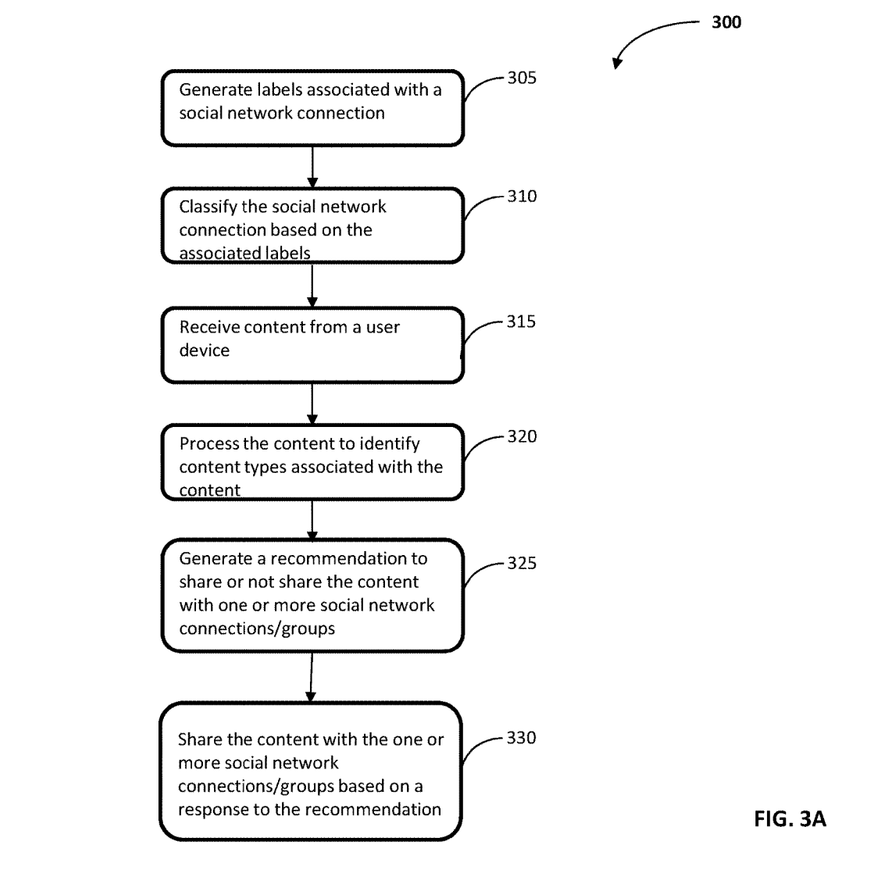
FIG. 3A is a flow diagram of a method for managing content in social networking sites in accordance with an exemplary embodiment.

Now referring to FIG. 3A, a flow diagram of a method 300 for managing content disclosure on social networking sites in accordance with an exemplary and non-limiting embodiment is depicted. At block 305, labels associated with a social network connection can be generated. In some embodiments of the invention, the one or more labels can be in the form of metadata or data tags. In some embodiments of the invention, metadata or data tags can be generated based on reactions of the social network connection to different social network posts. For example, the disclosure restriction engine 216 may obtain metrics or activity associated with the social network connection from a datastore, such as datastore 218. In some embodiments of the invention, the disclosure restriction engine 216 can process the activity associated with the social network connection to identify the type of action initiated by the social network connection (e.g., liking a post, responding to a comment, adding a hash tag, etc.). The disclosure restriction engine 216 can also determine whether the activity is a positive and/or negative action (e.g., liking a post, indicating that a post is sad, using positive or negative words in a comment, or the like). In some embodiments of the invention, the disclosure restriction engine 216 can generate rules based on a combination of the labels associated with a social network connection, a type of content being viewed by the social network connection and a reaction to the viewed content by the social network connection. For example, if an unlabeled social network connection reacts positively to a post of a picture on the social networking site, then the disclosure restriction engine 216 may use the content type associated with the picture to associate labels with the social network connection.

In some embodiments of the invention, the disclosure restriction engine 216 can display posts to gauge reactions and learn about users to populate data regarding the social network connection. For example, the disclosure restriction engine 216 can display predetermined content (e.g., social media postings that may contain graphic content or text about a preselected topic), which may be associated with a specific content type. The disclosure restriction engine 216 can monitor the reaction of the social network connection. The disclosure restriction engine 216 can receive an indication of a reaction (e.g., social network connection selects the "like" button associated with the post) from the social network connection and then process the indication of the reaction. The disclosure restriction engine 216 can generate the labels to associate with the social network connection based on the reaction from the social network connection.

At block 310, the social network connection can be classified based on the labels. In some embodiments of the invention, the disclosure restriction engine 216 can organize the social network connection into one or more groups based on the labels associated with the social network connection. The group can be designated by the user. In some embodiments of the invention, the group can be automatically generated by the disclosure restriction engine 216 based on determining that the number of social network connections associated with an identified label is greater than a predetermined threshold.

In some embodiments of the invention, the disclosure restriction engine 216 can determine a mood associated with the social network connection based on actions initiated by the social network connection. For example, if the social network connection "likes" multiple posts that are categorized as positive or happy, the disclosure restriction engine 216 may determine that the mood associated with the social network connection is happy. The social network connection can also use other positive or happy indications, for example, selecting an emoticon indicating a positive reaction to a post (thumbs up, heart, humor, etc.), a comment indicating a positive reaction to post, sharing the post, and re-tweeting a post. The social network connection can also indicate a mood that the social network connection is not happy, for example, an emoticon indicating a negative reaction to the content, and a comment indicating a negative reaction to the content. The social network connection can be associated with a label indicative of their mood. In some embodiments of the invention, the social network connection can be associated with a set of predetermined labels based on the determined mood. In some embodiments of the invention, the disclosure restriction engine 216 can periodically re-evaluate the mood of a social network connection. In some embodiments of the invention, the re-evaluation of the mood can be time based (e.g., every day, every week, etc.) or can be activity based (e.g., every 10 actions, every 100 actions, etc.). In some embodiments of the invention, the re-evaluation of the mood can be continuous (e.g., each action of the social network connection triggers a re-evaluation of their mood).

In some embodiments of the invention, the disclosure restriction engine 216 can receive an indication of a reaction to the content from the social network connection. For example, the social network connection may "like" a picture posted by another user of the social networking site. The disclosure restriction engine can generate a new label to associate with the social network connection based on the indication of the reaction to the content. For example, if the social network connection "likes" a picture of a puppy, labels that can be generated to associate with the social network connection can include "puppy" or "dog." The label may be associated with the social network connection. The social network connection can then be re-classified by the disclosure restriction engine 216 based on the new label associated for the social network connection. For example, the disclosure restriction engine 216 may categorize the social network into a group for "pictures of pets."

At block 315, content may be received from a user device 204. In some embodiments of the invention, the content received from the user device 204 can be user-generated content, such as a picture, link to a website, or text post. The data management engine 212 can receive the content from the user device 204 and can determine to transmit the content to the content processing engine 214.

At block 320, the content may be processed to identify content types within the content. In some embodiments of the invention, the content processing engine 214 can apply natural language processing, examine metadata or data tags associated with the content, or perform an image analysis of the content and may identify content types to associate with the content. In some embodiments of the invention, the content processing engine 214 can calculate or determine a confidence level to associate with the content. The confidence level is a numeric value indicative of a likelihood that the content and content type is categorized accurately. For example, if the content processing engine 214 positively determines that an object in a picture is a car, then the confidence level can be set at a higher value than a set threshold. If the content processing engine 214 cannot determine that an object is a car, then the content processing engine 214 can set the confidence level at a numeric value lower than the set threshold. The disclosure restriction engine 216 can determine whether to disclose the content to the social network connection based on the confidence level of the content and one or more tags associated with the social network connection.

At block 325, a recommendation to share or not share the content with an individual social network connection or one or more social network groups may be generated. In some embodiments of the invention, the disclosure restriction engine 216 can generate a recommendation to share or not share the content with the social network connection or a group that includes the social network connection. The recommendation can be based on a determination that the labels associated with the social network connection are the same as the content types associated with the content.

In some embodiments of the invention, the disclosure restriction engine 216 can present the recommendation to the user via the client application 206. The user can choose to reject or accept the recommendation using the client application 206. The data management engine 212 can receive the indication from the user device 204 and can direct the indication to the disclosure restriction engine 216.

At block 330, the content may be shared with the social network connection or one or more social network groups. In some embodiments of the invention, the disclosure restriction engine 216 can receive an indication on acceptance of the recommendation from the data management engine 212 and can facilitate sharing the content with the social network connection.

In some embodiments of the invention, a user may provide a label for association with an identified social network connection. For example, a user can provide a label through a client application 206 of a user device 204 to explicitly associate with a social network connection identified by the user via the client application 206. Now referring to FIG. 3B, a flow diagram of a method 350 for managing content disclosure on social networking sites in accordance with an exemplary and non-limiting embodiment is depicted. At block 355, a user of a social network can associate one or more labels with a social network connection. In some embodiments of the invention, the one or more labels can be in the form of metadata or data tags. For example, the user can know from a current relationship with a particular social network connection that the user would prefer to avoid political discussions with the social network connection or would prefer to have a political discussion with the social network connection. Accordingly, the user can, for example, associate a "political" label with the social network connection that can be used to direct political content generated by the user to the social network connection or restrict generated political content from being received by the social network connection. In some embodiments of the invention, the user can also group social network connections based on an associated label.

Figure 3B:
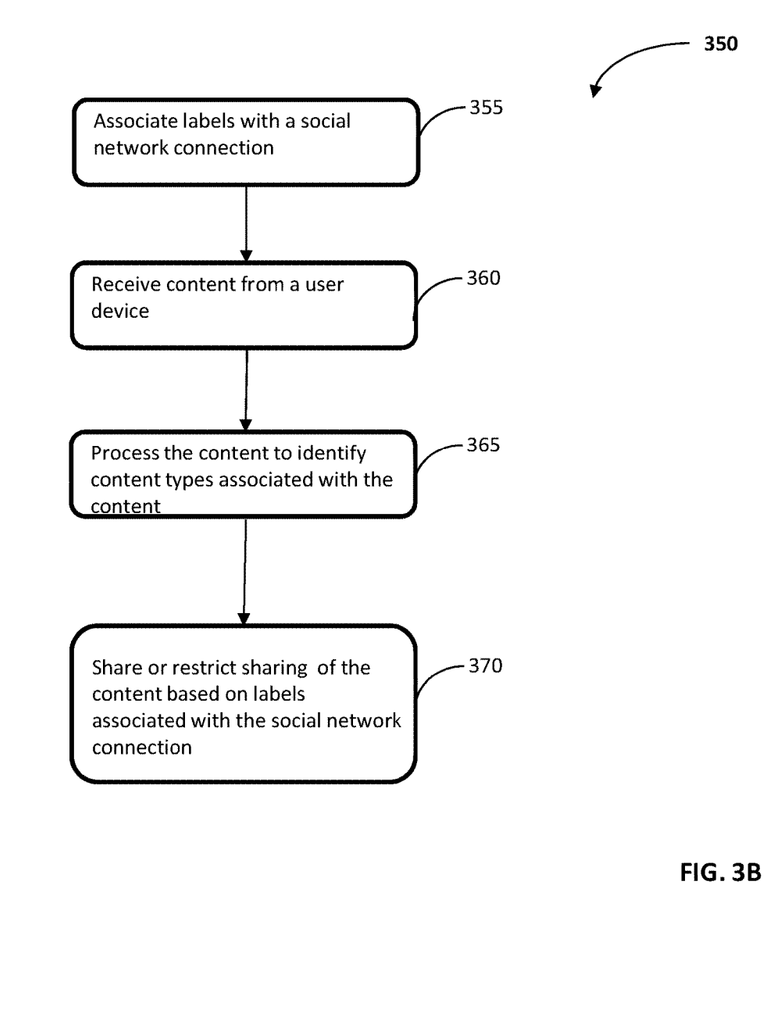
FIG. 3B is a flow diagram of a method for managing content in social networking sites in accordance with an exemplary embodiment.

At block 360, content can be received by the content processing engine 214 from a user device 204. In some embodiments of the invention, the content received from the user device 204 can be user-generated content, such as a picture, link to a website, or text post. The data management engine 212 can receive the content from the user device 204 and can determine to transmit the content to the content processing engine 214. The content can be associated with one or more content types using, for example, metadata or data tags.

At block 365, the content may be processed by the content processing engine 214 to determine one or more associated content types for the received content. For example, a content type can be, for example, political, family, humor, religious, relationship, sports, etc. In some embodiments of the invention, the content processing engine 214 can apply natural language processing to the content, examine metadata associated with the content, or perform an image analysis of the content to determine content types associated with the received content.

At block 370, the processed content can be shared with the social network connection or restricted from being received by the social network connection based the one or more labels associated with the social network connection and the determined one or more content types associated with the content. Accordingly, the user can dictate whether not content of a certain content type is viewable by a social network connection, or a grouping of social network connections.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models Are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models Are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Figure 4:
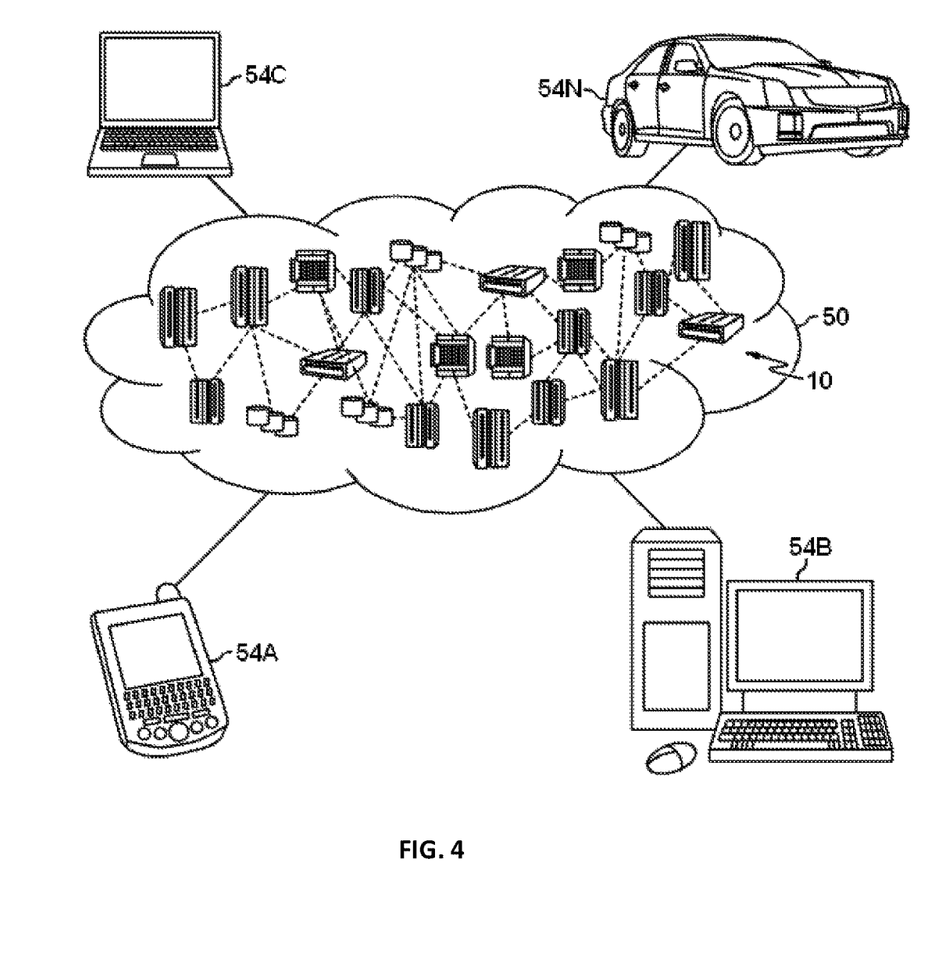
FIG. 4 depicts a cloud computing environment in accordance with an exemplary embodiment.

Referring now to FIG. 4, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
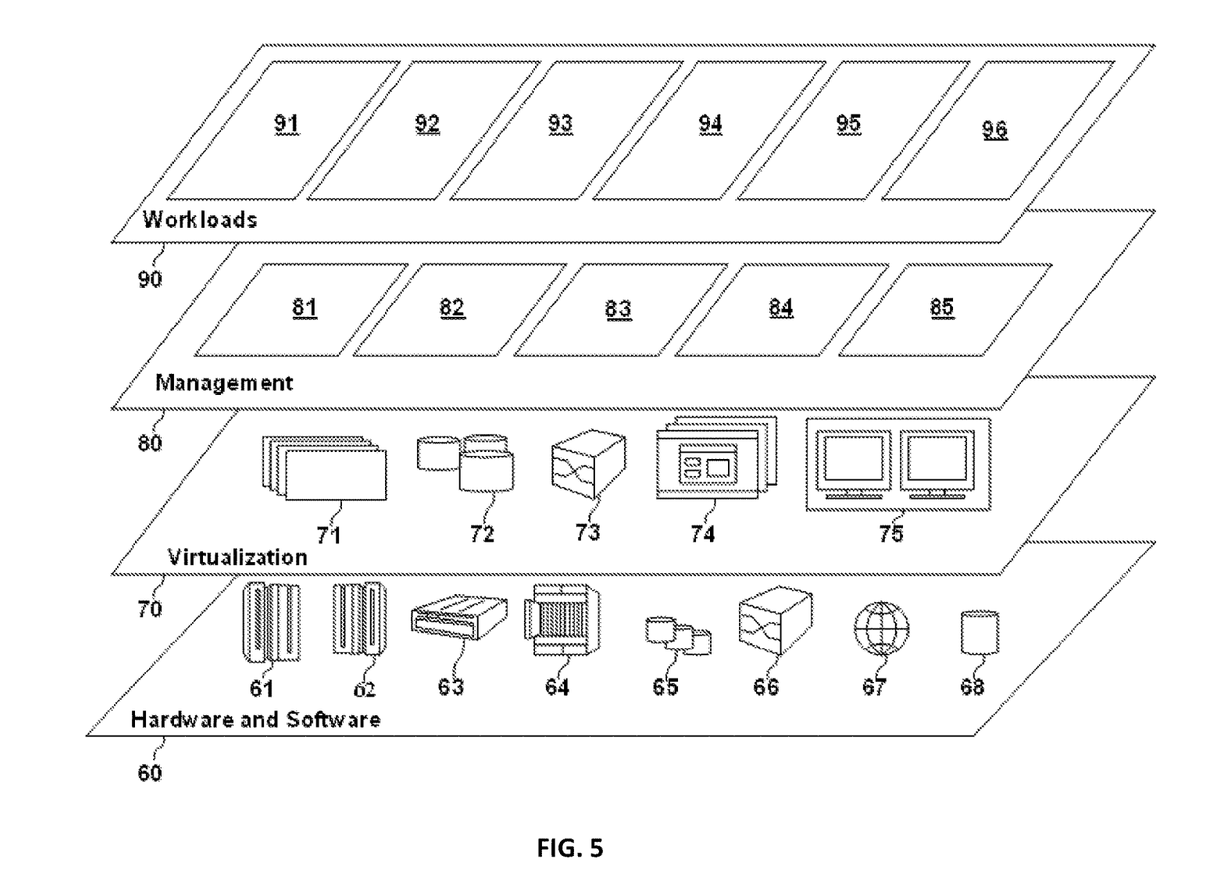
FIG. 5 depicts abstraction model layers in accordance with an exemplary embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions that may be provided from this layer include: mapping and navigation 91; software development and lifecycle management 92; virtual classroom education delivery 93; data analytics processing 94; transaction processing 95; and managing content disclosure on social networking sites 96.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for managing content disclosure on social networking sites, the method comprising:
monitoring, using a processor, user-generated content and one or more social network connections of a user viewing or listening to the user-generated content, the one or more social network connections comprising a first connection and a second connection;
classifying, using the processor, the user-generated content into one or more content types;
determining, using the processor, a positive mood of the first connection based on a reaction of the first connection to the user-generated content and a negative mood of the second connection based on a reaction of the second connection to the user-generated content;

associating, using the processor, the first connection with a first label indicative of the positive mood and the second connection with a second label indicative of the negative mood;

receiving, using the processor, further user-generated content;

determining, using the processor, one or more further content types from the further user-generated content;

generating, using the processor, a recommendation to share the further content with the first connection, wherein the recommendation is based on the first label and the determined one or more further content types; and generating, using the processor, a recommendation to not share the further content with the second connection, wherein the recommendation is based on the second label and the determined one or more further content types.

2. The computer-implemented method of claim 1 further comprising:

receiving, using the processor, an indication from the user of a preference to share or not share the further content with the one or more social network connections; and sharing or not sharing, by the processor, the further content with the social network connection based on the indication.

3. The computer-implemented method of claim 1, wherein the recommendation to share the further content is based on a positive reaction or a neutral reaction by the first connection.

4. The computer-implemented method of claim 3, wherein the positive reaction is at least one of the following: "liking" the content, an emoticon indicating a positive reaction to the content, a comment indicating a positive reaction to the content, sharing the content, and re-tweeting content.

5. The computer-implemented method of claim 1, wherein the recommendation to not share the further content is based on a negative reaction by the second connection.

6. The computer-implemented method of claim 5, wherein the negative reaction is at least one of the following: an emoticon indicating a negative reaction to the content, and a comment indicating a negative reaction to the content.

7. The computer-implemented method of claim 1, further comprising:

associating the content with a confidence level based at least in part on the labels associated with the one or more social network connections and one or more content types associated with the content, wherein the confidence level is a numeric value indicative of a likelihood that the content is accurately categorized; and determining to disclose the further content to the social network connection based on the confidence level of the content.

8. The computer-implemented method of claim 1, wherein classifying the user-generated content into one or more content types or determining one or more content types from the further user-generated content further comprises:

applying natural language processing or image analysis to the content or further content.

9. The computer-implemented method of claim 1, further comprising:

receiving a reaction to shared further content from the one or more social network connections; and adding or removing one or more labels associated with the one or more social network connections based on the reaction to the content types associated with the further content.

10. A computer program product, the computer program product comprising a non-transitory computer readable storage medium having program instructions embodied therewith, the program instructions readable by a processing circuit to cause the processing circuit to perform a method comprising:

monitoring user-generated content and one or more social network connections of a user viewing or listening to the user-generated content, the one or more social network connections comprising a first connection and a second connection;

classifying the user-generated content into one or more content types;

determining a positive mood of the first connection based on a reaction of the first connection to the user-generated content and a negative mood of the second connection based on a reaction of the second connection to the user-generated content;

associating the first connection with a first label indicative of the positive mood and the second connection with a second label indicative of the negative mood;

receiving further user-generated content;

determining one or more further content types from the further user-generated content;

generating a recommendation to share the further content with the first connection, wherein the recommendation is based on the first label and the determined one or more further content types; and generating a recommendation to not share the further content with the second connection, wherein the recommendation is based on the second label and the determined one or more further content types.

11. The computer program product of claim 10 further comprising:

receiving an indication from the user of a preference to share or not share the further content with the one or more social network connections; and sharing or not sharing the further content with the social network connection based on the indication.

12. The computer program product of claim 10, wherein a recommendation to share the further content is based on a positive reaction or a neutral reaction by the first connection.

13. The computer program product of claim 12, wherein the positive reaction is at least one of the following: "liking" the content, an emoticon indicating a positive reaction to the content, a comment indicating a positive reaction to the content, sharing the content, and re-tweeting content.

14. The computer program product of claim 10, wherein a recommendation to not share the further content is based on a negative reaction by the second connection.

15. The computer program product of claim 14, wherein the negative reaction is at least one of the following: an emoticon indicating a negative reaction to the content, and a comment indicating a negative reaction to the content.

16. The computer program product of claim 10, wherein classifying the user-generated content into one or more content types or determining one or more content types from the further user-generated content further comprises:

applying natural language processing or image analysis to the content or further content.

17. The computer program product of claim 10, further comprising:
  receiving a reaction to the shared further content from the one or more social network connections; and
  adding or removing one or more labels associated with the one or more social network connections based on the reaction to the content types associated with the further content.

18. The computer program product of claim 17 further comprising generating a further recommendation based on the one or more added or removed labels.

19. A computer system, comprising:
  a processor in communication with one or more types of memory, the processor configured to:
  monitor user-generated content and one or more social network connections of a user viewing or listening to the user-generated content, the one or more social network connections comprising a first connection and a second connection;
  classify the user-generated content into one or more content types;
  determine a positive mood of the first connection based on a reaction of the first connection to the user-generated content and a negative mood of the second connection based on a reaction of the second connection to the user-generated content;
  associate the first connection with a first label indicative of the positive mood and the second connection with a second label indicative of the negative mood;
  receive further user-generated content;
  determine one or more further content types from the further user-generated content;
  generate a recommendation to share the further content with the first connection, wherein the recommendation is based on the first label and the determined one or more further content types; and
  generate a recommendation to not share the further content with the second connection, wherein the recommendation is based on the second label and the determined one or more further content types.

20. The system of claim 19, wherein the processor is further configured to:
  receive an indication from the user of a preference to share the further content with the one or more social network connections; and
  share or not share the further content with the social network connection based on the indication.

* * * * *